United States Patent [19]

Villella

[11] 4,084,556
[45] Apr. 18, 1978

[54] INTERNAL COMBUSTION ENGINE

[76] Inventor: Tony R. Villella, 2030 N. Black Canyon, Phoenix, Ariz. 85009

[21] Appl. No.: 686,264

[22] Filed: May 14, 1976

[51] Int. Cl.$^2$ .......................................... F02B 75/02
[52] U.S. Cl. ................................ 123/75 B; 123/75 E; 123/105
[58] Field of Search ............... 123/75 B, 75 E, 105, 123/106

[56] References Cited

U.S. PATENT DOCUMENTS

| | | | |
|---|---|---|---|
| 1,305,172 | 5/1919 | Sawtelle | 123/75 E |
| 1,384,133 | 7/1921 | Howe | 123/75 E |
| 1,391,473 | 9/1921 | Hanson | 123/105 |
| 1,604,603 | 10/1926 | Powell | 123/105 |
| 1,623,589 | 4/1927 | Granath | 123/105 |
| 1,725,418 | 8/1929 | Prindle | 123/75 B |
| 1,869,455 | 8/1932 | Zarhowsky | 123/75 E |
| 1,907,470 | 5/1933 | Abell | 123/75 B |
| 3,416,502 | 12/1968 | Weiss | 123/75 E |
| 3,919,986 | 11/1975 | Goto | 123/75 E |

Primary Examiner—Charles J. Myhre
Assistant Examiner—David D. Reynolds
Attorney, Agent, or Firm—William H. Dean; Don J. Flickinger; John A. Robertson

[57] ABSTRACT

The disclosure relates to a multi cylinder four cycle gasoline engine having substantially conventional intake and exhaust valves in the head ends of the cylinders thereof and having side ports in the cylinders; said side ports in spaced relation to the head ends of the cylinders; a fuel mixture delivery means communicating with said ports; an auxilliary intake manifold which is enclosed; said auxilliary intake manifold communicating only with said intake valves at the head ends of the cylinders; second intake valves disposed to control and time the flow of fuel mixture into said cylinders through said ports.

9 Claims, 7 Drawing Figures

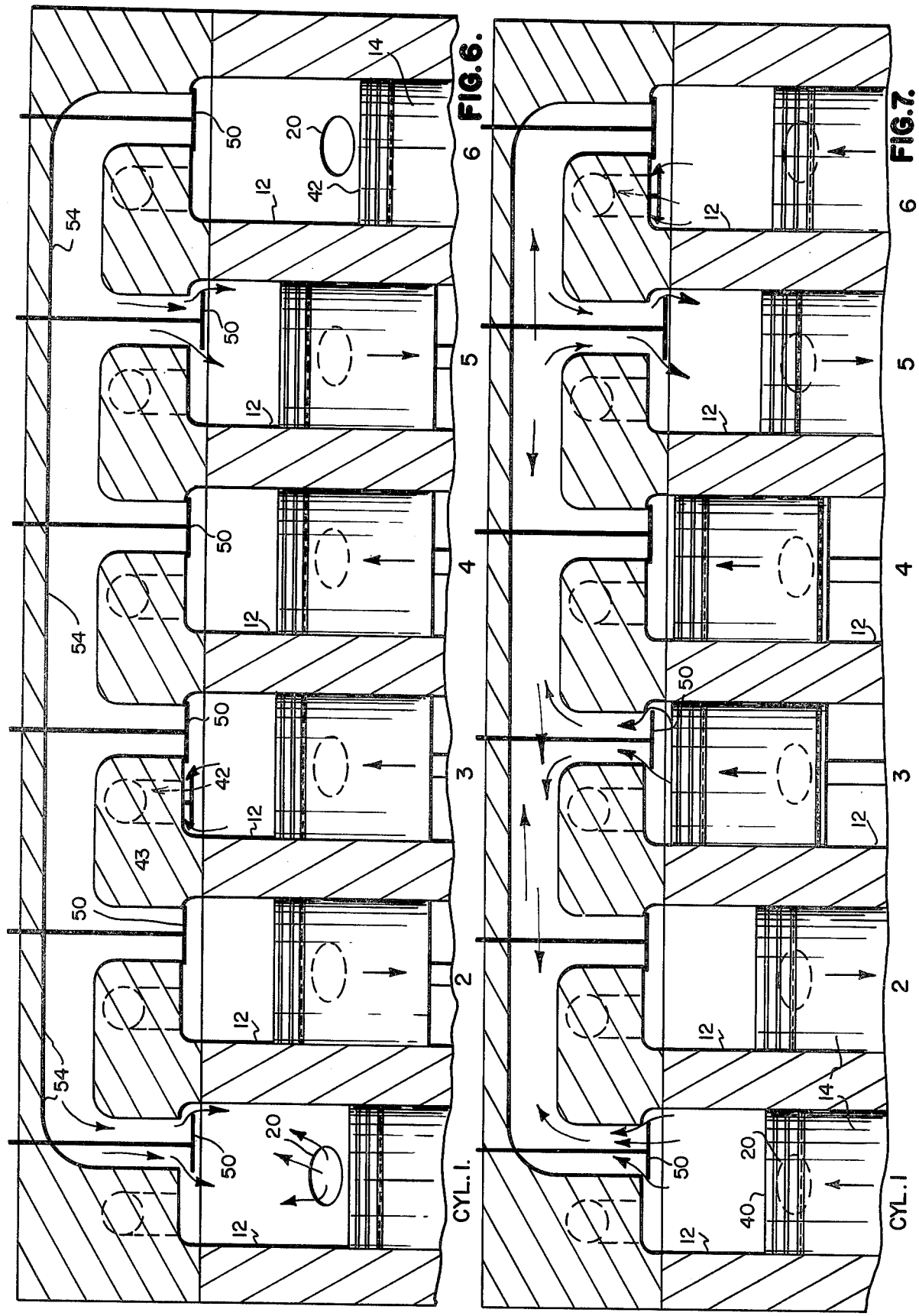

INTERNAL COMBUSTION ENGINE

BACKGROUND OF THE INVENTION

It has been a problem to operate internal combustion engines, such as automotive engines using gasoline, and to, at the same time, protect the ecology from emissions such as nitrogen oxides, hydrocarbons and carbon-monoxides, as well as other noxious gasses. Furthermore, it has been difficult to accomplish the foregoing while maintaining good gas mileage, as well as good driveability. Many approaches to a solution of the foregoing problems have been directed toward operating a four cycle gasoline engine on a lean fuel mixture and it has been found that extremely lean fuel ratios approaching 20:1 afford substantial solutions to the foregoing problems. However, the usual four cycle internal combustion engine, using such a lean mixture, has not been capable of reasonable performance and has been difficult to start, as well as exhibiting other functional problems. It is believed that conventional four cycle internal combustion engines, such as automotive engines, do not operate properly on an air-fuel mixture ratio, such as in the range of 18:1 to 20:1 air-fuel ratio mixtures, due to the fact that most induction and combustion cycles are such that lean mixture, when in the presence of unscavenged products of combustion from the previous cycle, do not ignite readily and therefore spark plug ignition is not entirely reliable during the starting of such engines when attempting to operate them with a very lean fuel mixture.

Conventional four cycle internal combustion engines also operate with the upper surfaces of the pistons at substantially high temperatures due to the fact that they are not efficiently cooled by the fuel mixture entering the cylinder through the intake valve due to the fact that the piston moves away from the fuel mixture very rapidly as it enters at the head end of the cylinder and thus, upon compression of the fuel mixture toward the head end, the hot piston tends to cause relatively high ignition temperatures and relatively high combustion temperatures which aggrevate the nitrogen oxide emissions problem.

It is known that a lean burn air-fuel ratio tends to minimize hydrocarbon emissions and also carbon monoxide emissions and accordingly, a great many attempts have been made to operate conventional four cycle internal combustion engines on very lean fuel mixture ratios. But, such engines have not performed properly in this manner.

SUMMARY OF THE INVENTION

The present invention comprises a multi cylinder four cycle internal combustion engine in which the head end of each cylinder communicates with a substantially conventional intake valve and a substantially conventional exhaust valve, and this engine also comprises a fuel mixture inlet port in each of the cylinders spaced from the head end of the cylinder, whereby an air-fuel mixture is admitted through said port and over the top of the respective piston thereby evaporatively cooling it as the fuel is admitted since the fuel travels from one side of the cylinder across the top of the piston. The engine also comprises an enclosing auxilliary intake manifold which is open only to the intake valves in the head ends of the cylinders and is enclosed such that a fuel mixture may travel only into or out of said auxilliary intake manifold through the intake valves in the head ends of the cylinders. Accordingly, the air-fuel mixture is admitted in response to vacuum created by movement of each respective piston from the head end of a respective cylinder toward the crank case end thereof and when the piston passes the port, the air-fuel mixture is drawn into the cylinder and subsequently the piston moves toward the head end of the cylinder and forces a portion of the fresh fuel mixture in the head end of the cylinder outwardly through the intake valves therein before the intake valve closes, and thus, charges the aforementioned auxilliary intake manifold with surplus fresh air-fuel mixture and whereby, upon closing of said intake valve at the head end of the cylinder, the fresh charge of the air-fuel mixture in the cylinder is exactly metered and the fresh fuel mixture in the head end of the cylinder, at the spark plug area, is clean and will ignite properly even though the air-fuel mixture is as lean as 20:1.

Each time one cylinder of the multi cylinder engine is operating on an intake stroke, one of the other cylinders of the engine is on a compression or exhaust stroke and thus, the auxilliary intake manifold is constantly being charged with fresh fuel charges hereinbefore mentioned and moved back and forth and very thoroughly mixed so that when the piston is on its intake and downward stroke or moving the crank case end of the cylinder, the intake valve admits some of the charge from the auxilliary intake manifold into the cylinder and this happens previous to the passage of the end of the piston beyond the aforementioned side port into which an air-fuel mixture is admitted due to a partial vacuum created by the piston as it moves toward the crank case into the cylinder.

Thus, the auxilliary intake manifold serves to mix the fresh fuel charge, which is forced through the intake valve and into the auxilliary intake manifold upon the compression stroke of the fresh fuel charge, and each cylinder, upon firing, holds a clean charge of an air-fuel mixture which is very lean and which is exactly metered due to the fact that as the piston moves toward the head end of the cylinder, the fuel charge is escaping through the intake valve into the auxilliary intake manifold until the intake valve closes, at which time a precise volume of fresh air-fuel mixture is contained in the respective cylinder above the piston thereof before it completes its compression stroke. In this manner, each cylinder is precisely charged with a fresh clean air-fuel mixture, all of which contributes to very smooth operation of the engine, as well as to the uniform power output relative to the firing of fuel at the head end of each piston in each respective cylinder. The auxilliary intake manifold functions efficiently to mix the fresh fuel charges due to the fact that alternate cycling of the respective cylinders relative to the auxilliary intake manifold causes all the gasses to move back and forth in the manifold and mix efficiently since they must be utilized from one position which is remote from the area in which they were inducted.

Accordingly, it is an object of the present invention to provide a very efficient and powerful multi cylinder four cycle engine which is capable of very nominal emissions of nitrogen oxides, hydrocarbons, carbon monoxies, and other noxious gasses.

Another object of the invention is to provide a novel multi cylinder internal combustion engine having intake and exhaust valves at the head ends of each of the cylinders and a side port for inducing fresh air-fuel mixture such that the side port is spaced from the head end of the cylinder and an auxilliary intake manifold is enclosed relative to the intake valves in the head end of the cylinder so that all the substantial flow into and out of the auxilliary intake manifold must pass through said intake valves.

Another object of the invention is to provide a multi cylinder four cycle internal combustion engine which is very smooth in operation and which will start readily and function well with very lean air-fuel mixture ratios commonly known as a "lean burn" and which are capable of providing for nominal emissions of noxious gasses.

Another object of the invention is to provide a novel four cycle multi cylinder gasoline engine very similar to conventional automotive engines and which is capable of being produced without substantial alteration to such engines and is therefore a very valuable solution to the well known ecology problems common to the operation of prior art four cycle internal combustion engines used in automobiles.

Further objects and advantages of the invention may be apparent from the following specification, appended claims and accompanying drawings.

BRIEF DESCRIPTION OF THE DRAWINGS

FIG. 6 is another view similar to FIGS. 4 and 5 taken on the line 6—6 of the diagram of FIG. 3; and FIG. 7 is another view similar to FIGS. 4, 5 and 6 taken on the line 7—7 of the diagram of FIG. 3.

DESCRIPTION OF THE PREFERRED EMBODIMENTS

Figure 1:
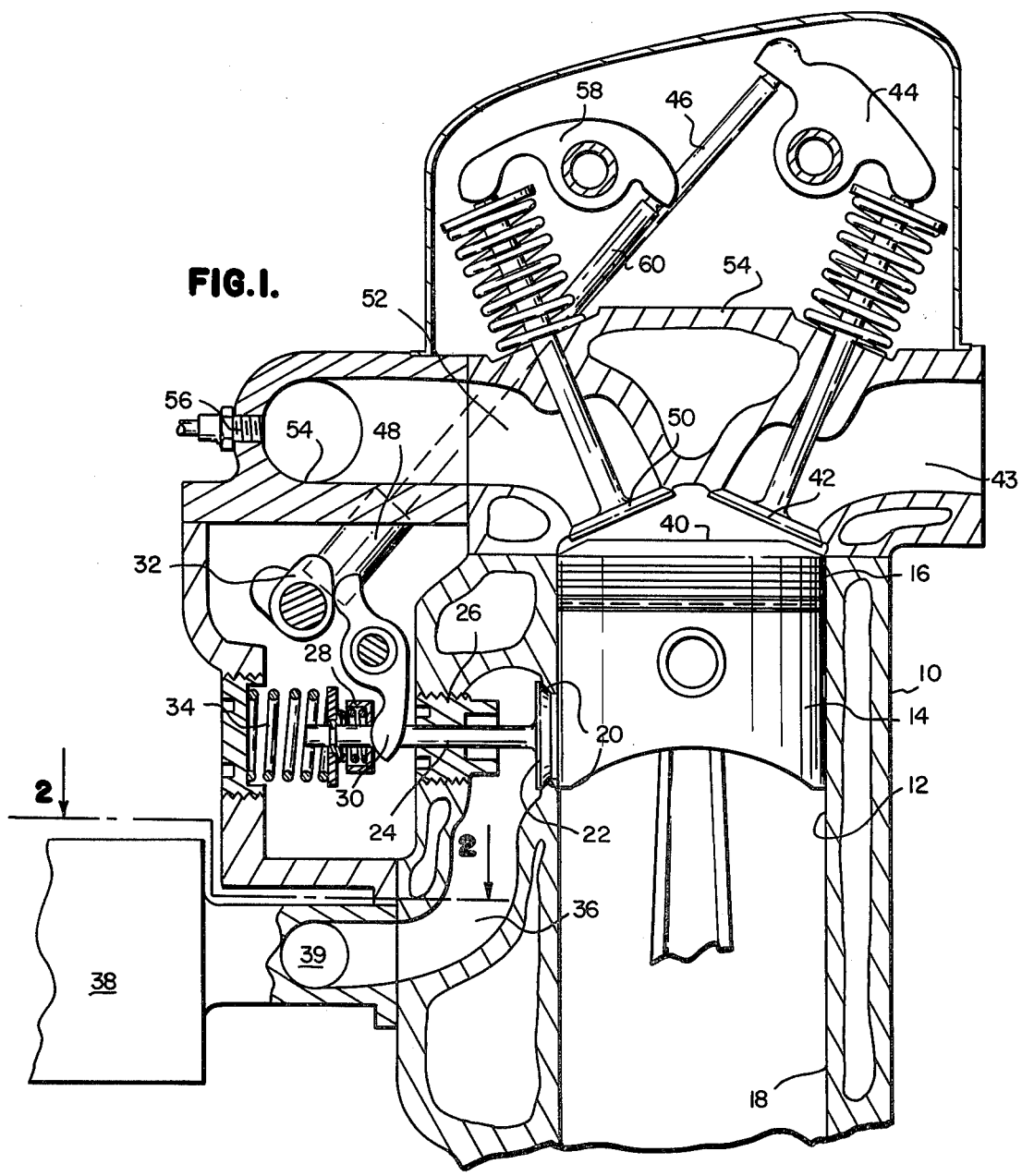
FIG. 1 is a fragmentary sectional view through a cylinder and comparable valve train and induction system of the engine of the invention.

The specific disclosure of the present invention relates to a six cylinder in line four cycle engine, such as shown fragmentarily in FIG. 1 of the drawings, wherein a cylinder block 10 is provided with a plurality of cylinders 12 with pistons 14 reciprocally mounted therein. Each cylinder 12 is provided with a head end 16 and a crank case end 18. Each cylinder 12 is provided with a side port 20 in the side wall thereof which is openable and closeable by means of an intake valve 22 which is provided with a conventional stem 24 in a guide 26 and this stem 24 is provided with a keeper 28 operable by a rocker arm 30 actuated by a conventional rotary cam shaft 32. A spring 34 operates to maintain the valve 20 on its seat when it is not retracted by the rocker arm 30.

Various conventional valve mechanisms may be substituted for this particular mechanism shown and it therefore only represents a means for opening and closing the side intake port 20.

Communicating with the port 20 is an intake passage 36 which communicates with a carburator 38 which may be a substantially conventional design and which is capable of providing an air-fuel mixture, which passes into the respective cylinder 12 when the valve 22 is open and when a top portion 40 of the respective piston 14 is in a position between the side port 20 and the crank case end 18 of the cylinder 14.

Communicating with the head end 16 of the cylinder 12 is a conventional poppet type exhaust valve 42 operated by a conventional rocker arm 44 actuated by a push rod 46 and lifter mechanism 48 actuated by the rotary cam shaft 32.

A substantially conventional intake valve 50 communicates with the interior of the head end 16 of the cylinder 12 and this valve 50 communicates with a port 52 in the cylinder head 53 and communicating with the port 52 is an auxilliary intake manifold 54.

Communicating with the interior of the auxilliary manifold 54 is a fitting 56 adapted for use with instrumentation or the like, but which is no part of the present invention.

The valve 50 is opened and closed by a conventional rocker arm 58 actuated by a push rod 60 and a respective lifter which is actuated by the rotary cam 32 which is a substantially conventional four cycle engine cam shaft.

Figure 2:
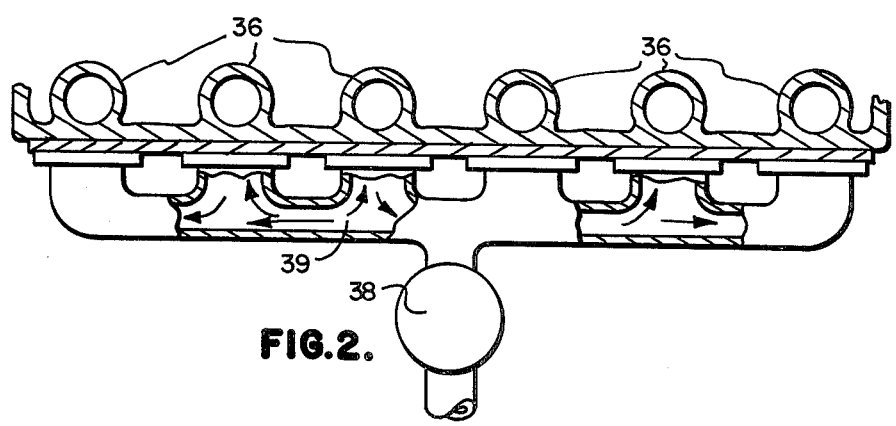
FIG. 2 is a reduced fragmentary sectional view taken from the line 2—2 of FIG. 1 showing portions broken away and in section to amplify the illustration.

The mechanism shown in FIG. 1 is common to all of the six cylinders shown in FIGS. 4 to 7 inclusive and, as shown in FIG. 2, the carburetor 38 communicates with an intake manifold 39, which in turn communicates with all of the passages 36 and respective ports 20 such as shown in FIG. 1 of the drawings.

In FIGS. 4 to 7 of the drawings, the auxilliary intake manifold 54 is shown in section and the intake valves 50 are shown diagramatically. In the actual mechanical arrangement, the valve stems and valve heads of the valves 50 are as shown in FIG. 1, and it will be seen that the auxilliary intake manifold 54 is enclosed and communicates only through the intake valves 50 with the cylinders 12. Therefore, an air-fuel mixture as will be hereinafter described may only pass into and out of the auxilliary intake manifold 54 through the intake valves 50 at the head ends of the respective cylinders 12.

By way of example only, it is to be understood that the surfaces 40 of the piston move in respective cylinders 12 toward the crank case end 18 thereof a distance equalling 90 to 130 degrees of crank shaft rotation before the surface 40 exposes the edge of the respective side port 20, which is nearest the head end 16 of the respective cylinder 12. It will be appreciated by those skilled in the art that various shapes of the side port 20 and variously proportioned four cycle engines may vary the spacing of the port 20 from the head end 16 of the cylinder 12.

It will be appreciated that the reference herein made to the number of degrees of crank shaft rotation is relative to a position from a top dead center position of the piston to the edge of the port 20 which is nearest the head end 16 of the cylinder 12. This top dead center position is shown in FIG. 1 of the drawings and, as hereinbefore stated, the foregoing relationships are by way of example only.

Figure 3:
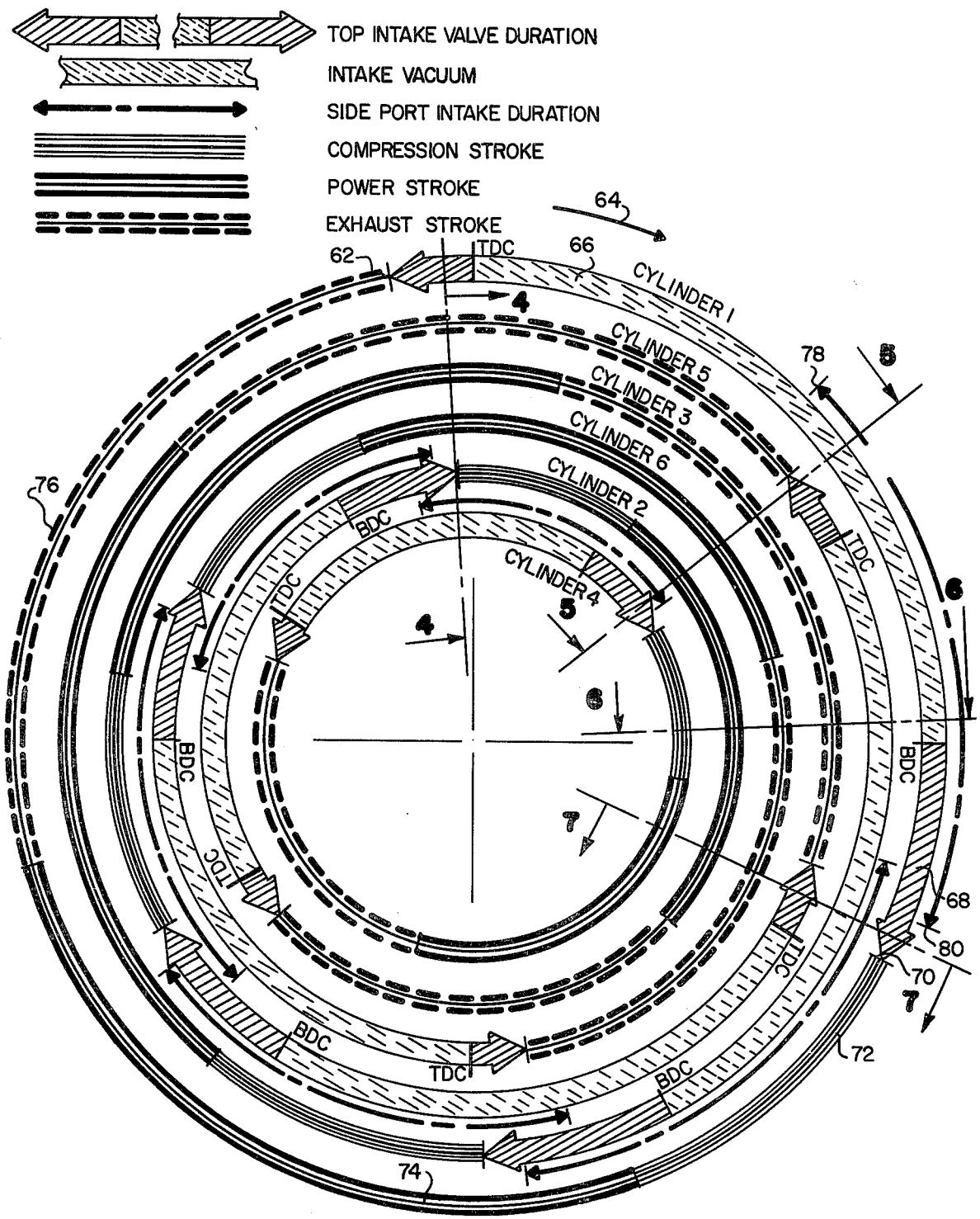
FIG. 3 is a diagramatic view of the four cycle functions of the engine of the invention.

The diagramatic view, FIG. 3, is related to a six cylinder in line engine and shows 360 degrees of cam shaft operation corresponding to 720 degrees of crank shaft rotation. The firing order of the six cylinder engine related to the diagram of FIG. 3 is 1,5,3,6,2,4, which firing order relates to the cylinders numbered from left to right 1-6 in FIGS. 4, 5, 6 and 7. The designations TDC are abbreviations for top dead center of the crank shaft rod bearing which position of the crank shaft corresponds with the end surface of the piston being at its extreme position in the head end of the respective cylinder.

BDC designates bottom dead center of the crank shaft rod bearing of a respective piston and cylinder, wherein the end of the piston is farthest from the head end of the respective cylinder.

Figure 4:
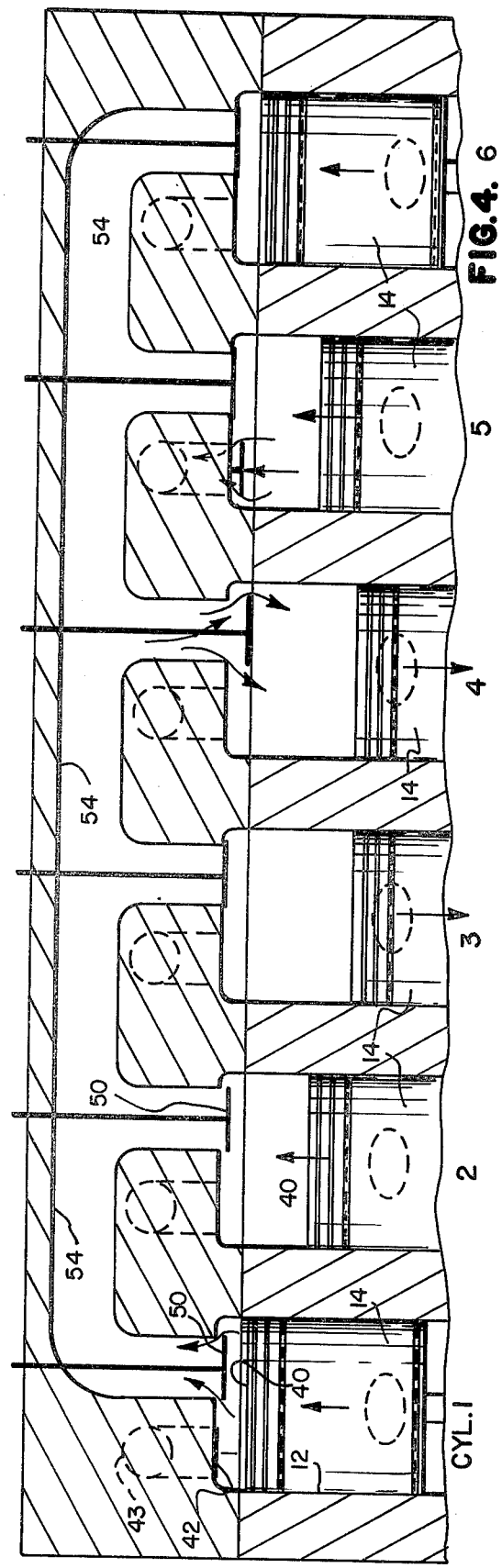
FIG. 4 is a diagramatic sectional view taken in correspondence with line 4—4 on the diagram of FIG. 3.

With reference to the section line 4—4 on FIG. 3 and with reference to the diagramatic view FIG. 4, it will be seen that the piston in cylinder 1 has its upper surface 40 close to the head end of the cylinder and that the exhaust stroke is being completed and the respective intake valve 50 has partially opened. At the same time, the end 40 of the piston 14 in cylinder 2 is moving toward the head end of the cylinder and is compressing a fuel charge preparatory to the firing thereof and just preliminary to the power stroke. With reference to FIG. 3, it will be seen that the intake valve 50 in the head end of cylinder 1 opens at 62 just before TDC and during the latter part of the exhaust stroke of the piston 14 in cylinder 1. Thus, the piston 14 is allowed, on its movement toward the head end of the cylinder, to complete exhaust through the respective exhaust valve 42 and into the respective exhaust port 43, as shown in FIGS. 1, 3 and 4 of the drawings. It will be understood that the exhaust valve closes at TDC and the piston 14 starts to move away from the head end of the cylinder toward the crank case end thereof and create vacuum 66 in the cylinder 1, all as shown best in FIGS. 3 and 4 of the drawings.

The piston 14 in cylinder 4 has, at the same time, moved a substantial distance toward the crank case end of the respective cylinder and has created high vacuum in the cylinder and has caused a substantial amount of the fuel mixture to pass from the auxilliary intake manifold 54 into cylinder 4 and this causes fuel mixture admitted through the intake valve 50 in cylinder 1 to progress a substantial distance down through the auxilliary intake manifold 54 and to mix with the fuel mixture therein, as will be hereinafter described.

Thus, it will be seen in FIG. 4 that the piston in cylinder 4 is in full intake position causing substantial vacuum and causing movement of fuel therein toward cylinder 4 and away from cylinder 1, thus causing the fuel emitted from cylinder 1 to mix in the auxilliary intake manifold 54.

As shown in FIG. 4, at the same time a power stroke has been almost completed in cylinder 3, a compression stroke is progressing in cylinder 2, while an exhaust stroke is progressing in cylinder 5 and in cylinder 6 a compression stroke is almost completed preparatory to firing a charge of fuel resulting in a power stroke on the piston 14 in the cylinder 6.

Figure 5:
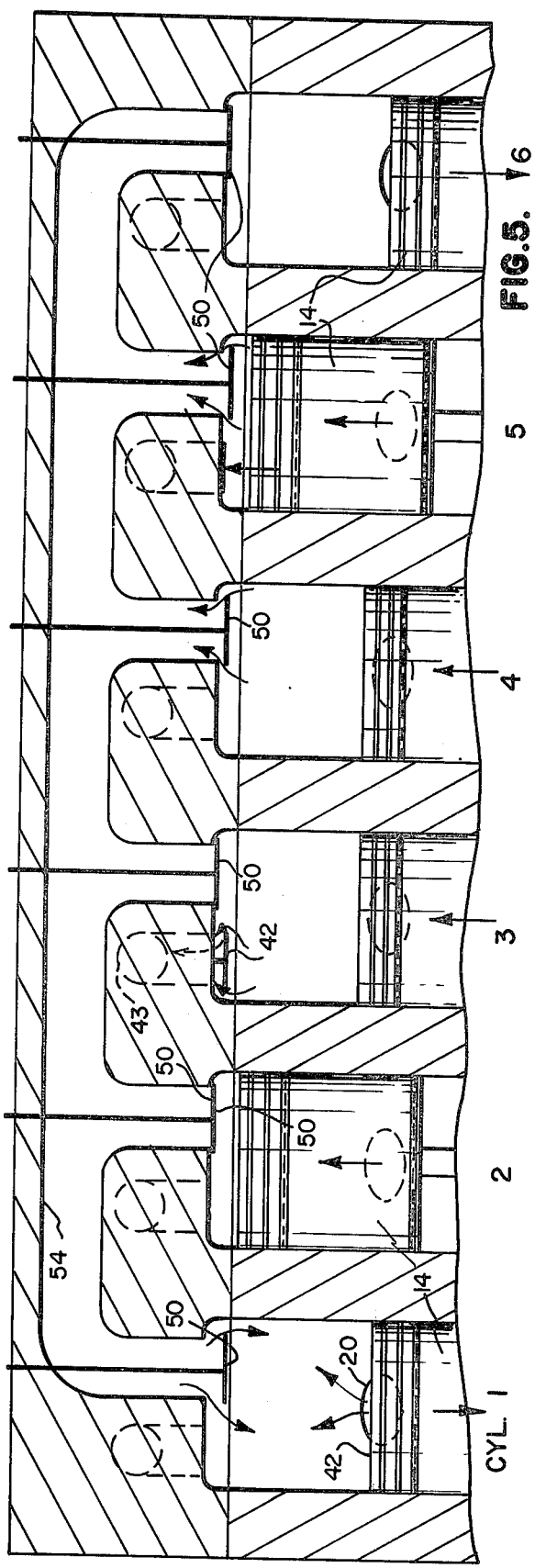
FIG. 5 is another view similar to FIG. 4 taken on the line 5—5 of the diagram of FIG. 3.

Referring to FIG. 3 and section line 5—5 which corresponds to FIG. 5, it will be seen that cylinder 1 has almost completed its intake stroke with the piston 14 moving toward the crank case end of the cylinder. At this time, the surface 42 of the piston has begun to uncover the respective port 20 and at this same time, the valve 22, as shown in FIG. 1, has been previously opened by the cam 32 and rocker 30 so that fresh fuel charge from the carburetor 38 flows through the port 20 and into the cylinder 1 to mix with fuel that has been concurrently admitted through the intake valve 50 from the auxilliary intake manifold 54. At this same time, the piston in cylinder 2 is in a compression stroke near TDC position and almost ready to receive the power stroke of the fuel under combustion.

Concurrently with the intake in cylinder 1, the piston in cylinder 3 is exhausting exhaust gasses into a respective port 43 through an exhaust valve 42 and in cylinder 4 a compression stroke is started with the intake valve 50 partially open allowing a charge of fresh fuel to be compressed through the valve 50 and into the auxilliary intake manifold 54.

Cylinder 6 in FIG. 5 is experiencing a power stroke.

It will be appreciated that in FIG. 5 the cylinder 1 is shown on the intake stroke, while cylinder 4 is concurrently delivering a mixture of fresh fuel charge to the interior of the auxilliary intake manifold in its exhaust stroke. In this manner, the fuel mixture moves rapidly back and forth through the auxilliary intake manifold so as to cause very efficient mixing thereof and to provide a charge for each upper end of each cylinder during the intake stroke. Also, it will be noted that when the compression stroke is being started in cylinder 4, that fresh fuel is charged into the auxilliary intake manifold 54, all as indicated in the diagram FIG. 3.

With reference to section line 6—6 in FIG. 3 of the drawings and with reference to FIG. 6, it will be seen that in cylinder 1 the piston 14 has reached its RDC position and that the intake port 20 is in full open position and admitting a fresh fuel mixture from the passage 36 and carberator 38 shown in FIG. 1 of the drawing. Thus, progression from FIGS. 4, and 5 to FIG. 6, the piston in cylinder 1 has moved from a substantially RDC position to a substantially BDC position. The piston in cylinder 2 in FIG. 6 is experiencing a power stroke, while the piston in cylinder 3 is moving toward the head end of the cylinder and forcing exhaust gasses out through the respective exhaust valve 42 and into the exhaust manifold port 43.

Concurrently, cylinder 4 is experiencing a compression stroke, while cylinder 5 is in an intake stroke drawing fuel mixture and unburned hydrocarbons from the auxilliary intake manifold 54 preliminary to the opening of the port 20; and cylinder 6 is beginning exhaust stroke.

In cylinder 6 in FIG. 6 of the drawings, the end 42 of the piston 14 is at the end of the power stroke and near the BDC position with the port 20 in closed position and with the valve 22 firmly seated on its respective seat.

With reference to section line 7—7 on FIG. 3 of the drawings and FIG. 7, it will be seen that the piston 14 in cylinder 1 is moving toward the head end of the cylinder and has passed the port 20 and is exhausting some of the fresh fuel mixture through the valve 50 and into the auxilliary intake manifold and cylinder 5 is on the intake stroke withdrawing a mixture of fresh fuel into the cylinder 5.

In cylinder 1 in FIG. 7, the valve 50 is near its closing position, which will result in a measured fuel charge which is precisely measured according to the position of the piston 14 at its surface 14 and the position at which the valve 50 closes. This provides for a metered volumetric supply of fresh fuel in cylinder 1 at the time the valve 50 closes.

As shown in FIG. 7 of the drawings, the cylinder 2 is experiencing a power stroke. In cylinder 3 the exhaust stroke is just about completed. In cylinder 4 the piston therein has reached the end of the compression stroke. In cylinder 5, as hereinbefore described, an intake stroke is fully underway and in cylinder 6 the piston is moving toward the head end of the cylinder and progressing with the exhaust stroke.

With reference to FIG. 3 of the drawings, it will be seen that, as shown in FIG. 4, the piston 14 is moving toward the head end of the cylinder and the intake valve 50 in cylinder 1 opens at 62, as shown in FIG. 3, and the exhaust valve 42 closes at the TDC position, shown in FIG. 3. Whereupon, subsequent downward movement of the piston in cylinder 1, as shown in FIG. 5 causes a vacuum condition 66 which draws fuel from the auxilliary intake manifold and also from the port 20 and carburetor 38 and this vacuum condition 66 continues until the piston in cylinder 1 reaches the BDC position, as shown in FIG. 6 of the drawings. Whereupon, the piston starts to move upwardly as shown in FIG. 7. This results in the beginning of a compression stroke in the cross hatched area designated 68. This compression stroke is concurrent with the open position of the valve 50 which closes at 70, as shown in FIG. 3. Whereupon, the compression stroke 72 takes place followed by the resultant power stroke 74 and then followed by the exhaust stroke 76, all processing in the direction of the arrow 64, as shown in FIG. 3 of the drawings; it being understood that FIG. 3 is a diagramatic view showing 360 degrees of cam shaft rotation and 720 degrees of crank shaft rotation correspondingly.

As shown in FIG. 3, the side port valve 22 related to cylinder 1 in FIG. 4 opens at 78 which is the position at which the piston passes the port 20 which is exemplified in FIG. 5 of the drawings; it being noted that the line 5—5 in FIG. 3 is slightly beyond the designation 78 at which the port is opened and this is also exemplified in FIG. 5 of the drawings.

The side port valve 22 closes at 80 slightly before the corresponding intake valve 50 closes and at this time the intake valve 50 of cylinder 1 is very near closing so that the compression stroke 72 may take place as the piston in cylinder 1 moves toward the head end of the cylinder with both the valve 50 and the respective valve 22 closed.

From the foregoing, it will be apparent that fresh fuel is induced from the carburetor 38 through the respective passage 36 and port 20 when the respective valve 22 is open. When the top of the respective piston passes the port 20, sufficient vacuum is created in the respective cylinder to cause aspiration of fuel mixture into the respective cylinder and this fuel mixture passes across the top of the respective piston 14 to cause evaporative cooling thereof during each intake stroke. At the same time, a mixture is admitted from the auxilliary intake manifold through the valve 50.

Subsequently, when the piston moves up on the compression stroke, the valve 50 remains open until a substantial amount of the mixture in the cylinder has been forced back into the auxiliary intake manifold and then the intake valve 50 closes and the compression stroke then progresses to completion.

When the intake valve 50 closes on the compression stroke, it precisely measures the amount of fresh fuel charge in the cylinder at the intermediate portion of the compression stroke. Thus, the engine of the invention operates in the manner such that each fuel charge in each of the cylinders 1 through 6 is very precisely measured and consequently the resultant firing strokes are very even and of the same force greatly contributing to the smooth operation and the production of shaft power from the engine.

From the foregoing, it will be obvious that the enclosed auxilliary intake manifold serves as a receiver for fresh fuel so as to start filling each cylinder on the intake stroke preliminary to the passage of the respective top portion 40 of the respective piston 14 relative to the respective port 20 at which time the vacuum in the cylinder is sufficient to cause substantial inflow of carbureted fuel mixture through the passage 36 and the port 20.

Due to the hereinbefore described induction system for fuel, and due to the manner in which fuel mixture is measured in the cylinders, the air-fuel ratios as high as 20:1 may be efficiently handled in the engine of the invention with good performance and good starting capabilities. This is due to the fact that each piston on its compression stroke forces fresh fuel mixture around the head end of the cylinder which has been previously charged with a mixture from the reserve intake manifold 54 and, as the fresh fuel passes outwardly through the valve 50 and into the reserve intake manifold 54, the fresh fuel mixture is evenly distributed around the ignition area of the conventional spark plug, not shown, and this provides for good ignition compared to that of conventional engines which may have a lack of proper scavenging in this area and consequently, such engines are unable to start properly with extremely lean air fuel mixtures. As hereinbefore pointed out, the very lean air-fuel mixtures have been proved to be desireable from the standpoint of minimizing the emission of noxious gases from the exhaust of the engine.

It will be obvious to those skilled in the art that various modifications may be resorted to without departing from the spirit of the invention.

I claim:

1. In a multi cylinder four cycle internal combustion engine; an engine block provided with cylinders therein; said cylinders each having a head end and a crank case end; a cam operated exhaust valve communicating with the interior of each cylinder at said head end thereof; a cam operated intake valve communicating with the interior of each cylinder at said head end thereof; an auxiliary intake manifold communicating with all of said intake valves; said cylinders each having an intake port in the sides thereof; said intake port being spaced from the head end of each respective cylinder; pistons reciprocably moveable in said cylinders; said pistons each having a top surface facing toward said head end of a respective cylinder; each top surface of each piston being moveable in each cylinder to a position between a respective intake port and a respective crank case end of the respective cylinder; air fuel mixture delivery means communicating with each of said ports whereby movement of each piston, toward said crank case end of a respective cylinder, creates a partial vacuum in a respective cylinder and in communication with the interior of said auxilliary intake manifold, when a respective one of said intake valves is open; and whereby said partial vacuum also admits an air fuel mixture to flow into said cylinder through said respective port from said air fuel mixture delivery means and whereby the next subsequent movement of said piston toward said head end of said cylinder compresses said mixture in said cylinder and thereby forces a surplus portion of said last mentioned mixture into said auxilliary intake manifold before said intake valve closes; whereupon the remainder of said mixture in said cylinder after said intake valve closes may be compressed by further movement of said piston, toward the head end of said cylinder, preparatory to the firing of said compressed remainder of said mixture in said cylinder when said piston is in the general area of its top dead center position depending upon the desired ignition location; said auxiliary intake manifold is enclosed and communicates only with said intake valves such that substantial flow from a respective one of said cylinders into said auxilliary intake manifold and from said auxilliary intake manifold into said cylinder can only occur through a respective intake valve when open.

2. The invention as defined in claim 1, wherein; cam means is provided for actuating said intake valve and said exhsut valve communicating with each of said respective cylinders; said cam means adapted to open said intake valve a few degrees before a respective piston approaches top dead center position in a respective cylinder; and said cam means openable to close said exhaust valve approximately at said top dead center position.

3. The invention as defined in claim 2, wherein: said auxilliary intake manifold is enclosed such that substantial volume flow from a respective cylinder into said auxilliary intake manifold and from said auxilliary intake manifold into said cylinder must occur through a respective intake valve when open.

4. The invention as defined in claim 1, wherein: cam means is provided for operating said intake and exhaust valves in a manner substantially common to conventional four cycle gasoline powered internal combustion engines.

5. The invention as defined in claim 4, wherein: said auxilliary intake manifold is enclosed such that substantial volume flow from a respective cylinder into said auxilliary intake manifold and from said auxilliary intake manifold into said respective cylinder can only occur through a respective intake valve when open.

6. The invention as defined in claim 1, wherein: said air fuel delivery means comprises a carburetor.

7. The invention as defined in claim 1, wherein: a second intake valve is disposed in communication with each of said intake ports of each of said cylinders; and cam means for operating said second intake valves.

8. The invention as defined in claim 7, wherein: said cam means, as defined in claim 7, is adapted to close each of said second intake valves and respective ports during movement of each respective piston toward said head end of a respective cylinder to prevent outflow of air fuel mixture from a respective cylinder through a respective port and toward said air fuel mixture delivery means.

9. The invention as defined in claim 2, wherein: a second intake valve is disposed in communication with each of said intake ports of each of said cylinders; and cam means for operating said second intake valves; said last mentioned cam means adapted to permit each of said second intake valves to close said respective ports during movement of a respective piston toward said head end of a respective cylinder to prevent outflow of air fuel mixture from a respective cylinder through a respective port and toward said air fuel mixture delivery means.

* * * * *